(12) United States Patent
Chung et al.

(10) Patent No.: US 9,353,200 B2
(45) Date of Patent: May 31, 2016

(54) THERMOPLASTIC (METH)ACRYLATE COPOLYMER, RESIN COMPOSITION COMPRISING SAME, AND MOLDED PRODUCTS THEREOF

(75) Inventors: Jin Hwa Chung, Uiwang-si (KR); Kee Hae Kwon, Uiwang-si (KR); Joo Hyun Jang, Uiwang-si (KR); Yong Hee Kang, Uiwang-si (KR); Ja Kwan Goo, Uiwang-si (KR); Man Suk Kim, Uiwang-si (KR); Kwang Soo Park, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 14/365,991

(22) PCT Filed: Dec. 29, 2011

(86) PCT No.: PCT/KR2011/010333
§ 371 (c)(1),
(2), (4) Date: Jun. 16, 2014

(87) PCT Pub. No.: WO2013/094801
PCT Pub. Date: Jun. 27, 2013

(65) Prior Publication Data
US 2014/0371344 A1    Dec. 18, 2014

(30) Foreign Application Priority Data

Dec. 20, 2011 (KR) .................. 10-2011-0138668

(51) Int. Cl.
| C08F 22/10 | (2006.01) |
| C08L 33/10 | (2006.01) |
| C08F 220/18 | (2006.01) |

(52) U.S. Cl.
CPC .............. *C08F 22/10* (2013.01); *C08F 220/18* (2013.01); *C08L 33/10* (2013.01)

(58) Field of Classification Search
CPC ......... C08F 22/16; C08F 220/18; C08L 33/10
See application file for complete search history.

(56) References Cited

U.S. PATENT DOCUMENTS

| 5,166,270 | A | 11/1992 | Hungenberg et al. |
| 6,391,418 | B1 | 5/2002 | Ueda et al. |
| 7,354,980 | B1 | 4/2008 | Mentak |
| 8,440,760 | B2 | 5/2013 | Kim et al. |
| 8,541,506 | B2 | 9/2013 | Kwon et al. |
| 2008/0154008 | A1* | 6/2008 | Jeong et al. ............... 526/329.7 |
| 2010/0152357 | A1* | 6/2010 | Kwon et al. ................ 524/502 |
| 2010/0197850 | A1* | 8/2010 | Kim ..................... C08F 220/18 524/502 |
| 2010/0256288 | A1 | 10/2010 | Kim et al. |

FOREIGN PATENT DOCUMENTS

| CN | 101747610 A | 6/2010 |
| CN | 101768347 A | 7/2010 |
| CN | 101827872 A | 9/2010 |
| CN | 102007183 A | 4/2011 |
| CN | 102115585 A | 7/2011 |
| JP | 03-124764 A | 5/1991 |
| JP | 2006-199732 A | 8/2006 |
| JP | 2006-313089 A | 11/2006 |
| KR | 10-0504967 B1 | 7/2005 |
| KR | 10-0665806 B1 | 1/2007 |
| KR | 10-0885819 B1 | 2/2009 |
| KR | 10-2009-0039612 A | 4/2009 |
| KR | 10-2009-0066204 A | 6/2009 |
| KR | 10-2010-0050778 A | 5/2010 |
| TW | 200936688 A | 9/2009 |
| WO | WO 2009/113573 A1 | 9/2009 |
| WO | WO 2009/128601 A1 | 10/2009 |

OTHER PUBLICATIONS

International Search Report issued in International Application No. PCT/KR2011/010333, dated Nov. 23, 2012, 4 pgs.
SIPO Office action dated Aug. 5, 2015 in corresponding Chinese Application No. 201180075738.9, 8 pages.
EPO Search Report dated Jul. 23, 2015, corresponding to European Patent application 12860942.7, (6 pages).
English Abstract of KR 20070002376 A which corresponds to KR 10-0665806 B1, 1 page.
International Search Report for PCT/KR2012/010470, mailed on Feb. 19, 2013, 2 pages.
Chinese Office Action dated Feb. 27, 2015, for corresponding Chinese Patent Application No. 2012-80062877.2, 8 pages.

* cited by examiner

*Primary Examiner* — Kuo-Liang Peng
(74) *Attorney, Agent, or Firm* — Lewis Roca Rothgerber Christie LLP

(57) ABSTRACT

Disclosed herein is a thermoplastic (meth)acrylate copolymer, which includes a derivative unit obtained from a monomer mixture including: (A) an aromatic (meth)acrylate having an index of refraction from about 1.580 to about 1.700; and (B) a monofunctional unsaturated monomer.

17 Claims, No Drawings

THERMOPLASTIC (METH)ACRYLATE COPOLYMER, RESIN COMPOSITION COMPRISING SAME, AND MOLDED PRODUCTS THEREOF

CROSS-REFERENCE TO RELATED APPLICATIONS

This application is a National Phase Patent Application and claims priority to and the benefit of International Application Number PCT/KR2011/010333, filed on Dec. 29, 2011, which claims priority to Korean Patent Application Number 10-2011-0138668, filed on Dec. 20, 2011, the entire contents of all of which are incorporated herein by reference.

TECHNICAL FIELD

The present invention relates to a thermoplastic (meth)acrylate copolymer, a resin composition including the same, and a molded product thereof. More particularly, the present invention relates to a thermoplastic (meth)acrylate copolymer which includes a methacrylate having an ultra-high refractive index to provide a high index of refraction, heat resistance, transparency and compatibility with polycarbonate, a resin composition including the same, and a molded product thereof.

BACKGROUND ART

Recently, there is increasing demand for exterior materials for electric and electronic products or automobiles having high functionality and high performance. In particular, with increasing emphasis on external appearances of molded resins, there is increasing demand for high gloss resin materials, which can exhibit pleasant texture and scratch resistance at the same time, and high heat resistant materials, which can be used together with a heat emitting device, such as a light emitting diode (LED).

Acrylic resins capable of exhibiting scratch resistance, particularly, polymethylmethacrylate (PMMA), exhibit excellent properties in terms of transparency, weather resistance, mechanical strength, surface gloss, adhesion, and the like. However, such acrylic resins have drawbacks of poor impact resistance and heat resistance. In order to secure scratch resistance and heat resistance at the same time, it has been attempted to increase the number of covalent bonds in the backbone through post modification after preparation of a polymethyl methacrylate copolymer having good scratch resistance. However, since this method is not suitable for mass production due to a long time for post-treatment and high production costs resulting from the post treatment, this method has been restrictively used in the art. Moreover, this method requires the post-treatment, thereby causing deterioration in mechanical properties of the resin.

In order to achieve properties including scratch resistance, high refractivity and high heat resistance while overcoming such problems, there is proposed a method in which a highly refractive monomer having a high index of refraction and exhibiting heat resistance is subjected to copolymerization in preparation of a PMMA copolymer resin. However, this method has restriction in improvement in the index of refraction or heat resistance of the copolymer prepared using the highly refractive monomer.

DISCLOSURE

Technical Problem

It is an aspect of the present invention to provide a thermoplastic (meth)acrylate copolymer having a high index of refraction and improved heat resistance.

It is another aspect of the present invention to provide a highly heat resistant thermoplastic (meth)acrylate copolymer having an index of refraction from 1.495 to 1.640, exhibiting excellent transparency, and having a specific molecular weight.

It is a further aspect of the present invention to provide a thermoplastic (meth)acrylate copolymer capable of minimizing deterioration in transparency, colorability and mechanical properties upon blending with polycarbonate.

It is yet another aspect of the present invention to provide a method of preparing the thermoplastic (meth)acrylate copolymer.

It is yet another aspect of the present invention to provide a molded product using a resin composition including the thermoplastic (meth)acrylate copolymer.

Technical Solution

One aspect of the present invention relates to a thermoplastic (meth)acrylate copolymer. In some embodiments, the thermoplastic (meth)acrylate copolymer includes a derivative unit obtained from a monomer mixture comprising: (A) an aromatic (meth)acrylate having an index of refraction from about 1.580 to about 1.700; and (B) a monofunctional unsaturated monomer.

In some embodiments, the monomer mixture includes: about 1 percent by weight (wt %) to about 50 wt % of the (A) aromatic (meth)acrylate having an index of refraction from about 1.580 to about 1.700; and about 50 wt % to about 99 wt % of the (B) the monofunctional unsaturated monomer.

The thermoplastic (meth)acrylate copolymer may further include, optionally, about 49 wt % or less of a derivative unit obtained from an alicyclic or aromatic (meth)acrylate having an index of refraction from about 1.490 to about 1.579.

In some embodiments, the thermoplastic (meth)acrylate copolymer may have a non-crosslinked structure.

In some embodiments, the thermoplastic (meth)acrylate copolymer may have a glass transition temperature from about 90° C. to about 150° C., and may permit extrusion or injection molding at a temperature higher than or equal to the glass transition temperature.

In some embodiments, the thermoplastic (meth)acrylate copolymer may have a Vicat softening temperature (VST) from about 100° C. to about 140° C., as measured under conditions of a load of 5 kg at 50° C./hr in accordance with ASTM D1525.

In some embodiments, the thermoplastic (meth)acrylate copolymer may have a weight average molecular weight from about 3,000 g/mol to about 300,000 g/mol.

The thermoplastic (meth)acrylate copolymer may have an index of refraction at a thickness of 2.5 mm from about 1.495 to about 1.640, and a transmittance of about 85% or higher as measured in accordance with ASTM D1003.

In some embodiments, the (A) aromatic (meth)acrylate having an index of refraction from about 1.580 to about 1.700 may include a biphenyl structure.

In some embodiments, the (A) aromatic (meth)acrylate may include a structure represented by Formula 1:

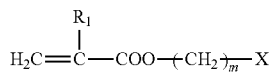

[Formula 1]

(wherein $R_1$ is hydrogen or a methyl group; m is an integer from 0 to 10; and X is a substituted or unsubstituted biphenyl group, or a substituted or unsubstituted terphenyl group).

The (B) monofunctional unsaturated monomer may include a $C_1$ to $C_8$ alkyl(meth)acrylate; an unsaturated carboxylic acid including methacrylic acid; an acid anhydride including maleic anhydride; a hydroxyl group-containing (meth)acrylate; (meth)acrylamide; unsaturated nitrile; allyl glycidyl ether; glycidyl methacrylate; and styrene monomers. These may be used alone or as mixtures thereof.

In some embodiments, the (C) alicyclic or aromatic (meth)acrylate having an index of refraction from about 1.490 to about 1.579 may include a structure represented by Formula 2 or Formula 3:

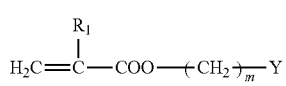
[Formula 2]

(wherein $R_1$ is hydrogen or a methyl group; m is an integer from 0 to 10; and Y is a substituted or unsubstituted $C_5$ to $C_{20}$ cycloalkyl group, a substituted or unsubstituted $C_6$ to $C_{20}$ aryl group, or a substituted or unsubstituted $C_6$ to $C_{20}$ aralkyl group);

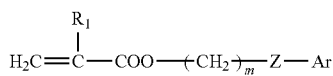
[Formula 3]

(wherein $R_1$ is hydrogen or a methyl group; m is an integer from 0 to 10; Z is oxygen (O) or sulfur (S); and Ar is a substituted or unsubstituted $C_5$ to $C_{20}$ cycloalkyl group, a substituted or unsubstituted $C_6$ to $C_{20}$ aryl group, or a substituted or unsubstituted $C_6$ to $C_{20}$ aralkyl group).

In one embodiment, the thermoplastic (meth)acrylate copolymer may further include additives such as flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, and flame-proofing agents. These additives may be used alone or as mixtures thereof.

Another aspect of the present invention relates to a method of preparing the thermoplastic (meth)acrylate copolymer. The method includes suspension polymerization by adding a radical polymerization initiator to a monomer mixture including (A) an aromatic (Meth)acrylate having an index of refraction from about 1.580 to about 1.700 and (B) a monofunctional unsaturated monomer.

The monomer mixture may further include an alicyclic or aromatic (meth)acrylate having an index of refraction from about 1.490 to about 1.579.

In some embodiments, the polymerization may be performed in the presence of a suspension stabilizer and a chain-transfer agent.

In one embodiment, the method may further include adding additives, such as flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and the like, to the monomer mixture. The additives may be used alone or as mixtures thereof.

A further aspect of the present invention relates to a molded product formed by extrusion or injection molding of a resin composition including the thermoplastic (meth)acrylate copolymer. The molded product may be formed by extrusion or injection molding of the resin composition, which includes the thermoplastic (meth)acrylate copolymer alone, or a mixture of the thermoplastic (meth)acrylate copolymer and other resins. In some embodiments, the resin composition may include the thermoplastic (meth)acrylate copolymer and a polycarbonate resin.

Advantageous Effects

The present invention provides a thermoplastic (meth)acrylate copolymer, which exhibits high refractivity, transparency and good heat resistance, can minimize deterioration in transparency and colorability upon blending with a resin having a high index of refraction, and exhibits excellent scratch resistance, a method of preparing the same, and a molded product including the same.

BEST MODE

Hereinafter, embodiments of the present invention will be described in detail. However, it should be understood that the following embodiments are given by way of illustration only and the present invention is not limited thereto. The scope of the present invention is defined only by the claims and equivalents thereof.

As used herein, the term "(meth)acryl" may refer to both "acryl" and "methacryl", unless specifically stated otherwise. For example, "(meth)acrylate" means both "acrylate" and "methacrylate".

According to some embodiments of the invention, a thermoplastic (meth)acrylate copolymer includes a derivative unit obtained from a monomer mixture, which includes: (A) an aromatic (meth)acrylate having an index of refraction from about 1.580 to about 1.700; and (B) a monofunctional unsaturated monomer.

In other embodiments, the thermoplastic (meth)acrylate copolymer may further include (C) a derivative unit obtained from an alicyclic or aromatic (meth)acrylate having an index of refraction from about 1.490 to about 1.579.

Hereinafter, the respective monomers will be described in more detail.

(A) Aromatic (meth)acrylate having an index of refraction from about 1.580 to about 1.700

The aromatic (meth)acrylate (A) has an index of refraction from about 1.580 to about 1.700 and includes a biphenyl structure.

In one embodiment, the aromatic (meth)acrylate (A) may include a structure represented by Formula 1:

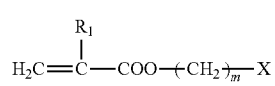
[Formula 1]

(wherein $R_1$ is hydrogen or a methyl group; m is an integer from 0 to 10; and X is a substituted or unsubstituted biphenyl group, or a substituted or unsubstituted terphenyl group).

As used herein, the term "substituted" means that at least one hydrogen atom in a compound is substituted with a halogen atom, a $C_1$ to $C_{10}$ alkyl group, a $C_1$ to $C_{10}$ alkoxy group, a $C_6$ to $C_{20}$ aryl group, a $C_6$ to $C_{20}$ aryloxy group, a $C_5$ to $C_{20}$ cycloalkyl group, or combinations thereof.

In some embodiments, X may be selected from the group consisting of o-biphenyl, m-biphenyl, p-biphenyl, 2,6-terphenyl, o-terphenyl, m-terphenyl, and p-terphenyl groups.

Examples of the aromatic (meth)acrylate (A) may include o-biphenyl methacrylate, m-biphenyl methacrylate, p-biphenyl methacrylate, 2,6-terphenyl methacrylate, o-terphenyl methacrylate, m-terphenyl methacrylate, p-terphenyl methacrylate, 4-(4-methylphenyl)phenyl methacrylate, 4-(2-methylphenyl)phenyl methacrylate, 2-(4-methylphenyl)phenyl methacrylate, 2-(2-methylphenyl)phenyl methacrylate, 4-(4-ethylphenyl)phenyl methacrylate, 4-(2-ethylphenyl)phenyl methacrylate, 2-(4-ethylphenyl)phenyl methacrylate, and 2-(2-ethylphenyl)phenyl methacrylate, without being limited thereto. These may be used alone or as mixtures thereof.

The aromatic (meth)acrylate (A) may be present in an amount of about 1 wt % to about 50 wt % in the thermoplastic (meth)acrylate copolymer. Within this range, the thermoplastic (meth)acrylate copolymer can obtain good property balance between high index of refraction, transparency, and heat resistance. Preferably, the aromatic (meth)acrylate (A) is present in an amount of about 5 wt % to about 40 wt %, for example, about 10 wt % to about 35 wt %. Within this range, the thermoplastic (meth)acrylate copolymer can obtain better property balance between high index of refraction and heat resistance.

(B) Monofunctional Unsaturated Monomer

The monofunctional unsaturated monomer (B) according to the invention is a monomer containing a single unsaturated group. Examples of the monofunctional unsaturated monomer (B) may include a $C_1$ to $C_8$ alkyl(meth)acrylate; an unsaturated carboxylic acid including methacrylic acid; an acid anhydride including maleic anhydride; a hydroxyl group-containing (meth)acrylate; (meth)acrylamide; unsaturated nitrile; allyl glycidyl ether; glycidyl methacrylate; styrene monomers, and the like. These may be used alone or as mixtures thereof.

In some embodiments, the monofunctional unsaturated monomer (B) may include methyl methacrylate, ethyl methacrylate, propyl methacrylate, butyl methacrylate, methyl acrylate, ethyl acrylate, propyl acrylate, butyl acrylate, 2-ethylhexyl acrylate, acrylic acid, methacrylic acid, maleic anhydride, 2-hydroxyethyl acrylate, 2-hydroxypropyl acrylate, mono glycerol acrylate, acrylamide, methacrylamide, acrylonitrile, methacrylonitrile, allyl glycidyl ether, glycidyl methacrylate, styrene, α-methylstyrene, and the like. Preferably, the monofunctional unsaturated monomer (B) is a $C_1$ to $C_8$ alkyl(meth)acrylate, more preferably $C_1$ to $C_4$ alkyl(meth)acrylate. In this case, the thermoplastic (meth)acrylate copolymer can exhibit better scratch resistance and transparency.

In some embodiments, a mixture of methacrylate and acrylate may be used. In this case, the methacrylate and the acrylate may be mixed in a weight ratio of about 15:1 to about 45:1. Within this range, the thermoplastic (meth)acrylate copolymer can exhibit excellent thermal stability and fluidity.

According to the present invention, the monofunctional unsaturated monomer (B) may be present in an amount of about 50 wt % to about 99 wt % in the thermoplastic (meth)acrylate copolymer. Preferably, the monofunctional unsaturated monomer (B) is present in an amount of about 55 wt % to about 95 wt %. Within this range, the thermoplastic (meth)acrylate copolymer has good property balance between scratch resistance, fluidity, transparency, and flame retardancy.

In some embodiments, the content of the aromatic (meth)acrylate (A) may be greater than the content of the monofunctional unsaturated monomer (B). For example, the aromatic (meth)acrylate (A) and the monofunctional unsaturated monomer (B) may be present in a weight ratio of (A):(B) from about 9:1 to about 1.5:1. Within this range, the thermoplastic (meth)acrylate copolymer has good property balance between transparency, heat resistance and scratch resistance.

(C) Alicyclic or aromatic (meth)acrylate having an index of refraction from about 1.490 to about 1.579

The alicyclic or aromatic (meth)acrylate (C) according to the present invention has an index of refraction from about 1.490 to about 1.579 and includes a structure represented by Formula 2 or Formula 3.

[Formula 2]

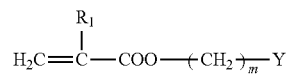

(wherein $R_1$ is hydrogen or a methyl group; m is an integer from 0 to 10; and Y is a substituted or unsubstituted $C_5$ to $C_{20}$ cycloalkyl group, a substituted or unsubstituted $C_6$ to $C_{20}$ aryl group, or a substituted or unsubstituted $C_6$ to $C_{20}$ aralkyl group).

In some exemplary embodiments, Y may be selected from the group consisting of a cyclohexyl group, a phenyl group, a methylphenyl group, a methylethylphenyl group, a methoxyphenyl group, a propylphenyl group, a cyclohexylphenyl group, a chlorophenyl group, a bromophenyl group, and a benzylphenyl group.

[Formula 3]

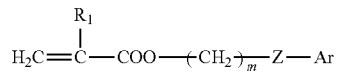

(wherein $R_1$ is hydrogen or a methyl group; in is an integer from 0 to 10; Z is oxygen (O) or sulfur (S); and Ar is a substituted or unsubstituted $C_5$ to $C_{20}$ cycloalkyl group, a substituted or unsubstituted $C_6$ to $C_{20}$ aryl group, or a substituted or unsubstituted $C_6$ to $C_{20}$ aralkyl group).

In some exemplary embodiments, Ar may be selected from the group consisting of a cyclohexyl group, a phenyl group, a methylphenyl group, a methylethylphenyl group, a methoxyphenyl group, a cyclohexylphenyl group, a chlorophenyl group, a bromophenyl group, and a benzylphenyl group.

Examples of the aromatic or alicyclic methacrylate may include methacrylic acid, such as cyclohexyl methacrylate, phenoxy methacrylate, 2-ethylphenoxy methacrylate, benzyl methacrylate, phenyl methacrylate, 2-ethylthiophenyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethyl methacrylate, 2-(4-(1-methylethyl)phenypethyl methacrylate, 2-(4-methoxyphenypethyl methacrylate, 2-(4-cyclohexylphenyl)ethyl methacrylate, 2-(2-chlorophenyl)ethyl methacrylate, 2-(3-chlorophenyl)ethyl methacrylate, 2-(4-chlorophenyl)ethyl methacrylate, 2-(4-bromophenypethyl methacrylate, 2-(3-phenylphenyl)ethyl methacrylate, and 2-(4-benzylphenyl)ethyl methacrylate, without being limited thereto. These may be used alone or as mixtures thereof.

The alicyclic or aromatic (meth)acrylate (C) may be optionally present in an amount of 49 wt % or less in the thermoplastic (meth)acrylate copolymer. Preferably, the alicyclic or aromatic (meth)acrylate (C) is present in an amount of 40 wt % or less. Within this range, the thermoplastic (meth)acrylate copolymer has improved property balance between index of refraction and heat resistance.

According to the present invention, the thermoplastic (meth)acrylate copolymer may be prepared by a typical polymerization method known in the art, for example, bulk polymerization, emulsion polymerization or suspension polymerization. Preferably, the thermoplastic (meth)acrylate copolymer is prepared by suspension polymerization.

In some embodiments, the thermoplastic (meth)acrylate copolymer may be prepared by polymerization of a monomer mixture including about 1 wt % to about 50 wt % of the (A) aromatic (meth)acrylate having an index of refraction from about 1.580 to about 1.700; about 50 wt % to about 99 wt % of the (B) monofunctional unsaturated monomer; and, optionally, 49 wt % or less of the (C) alicyclic or aromatic (meth)acrylate having an index of refraction from about 1.490 to about 1.579.

For example, a mixed reaction liquid is prepared by adding a polymerization initiator and a chain-transfer agent to the monomer mixture, followed by suspension polymerization by introducing the mixed reaction liquid into an aqueous solution including a suspension stabilizer dissolved therein.

Polymerization temperature and polymerization time may be suitably adjusted. For example, polymerization may be performed at about 65° C. to about 125° C., preferably at about 70° C. to about 120° C., for about 2 hours to about 8 hours.

The polymerization initiator may be a typical radical polymerization initiator known in the art. Examples of the polymerization initiator may include octanoyl peroxide, decanoyl peroxide, lauroyl peroxide, benzoyl peroxide, monochlorobenzoyl peroxide, dichlorobenzoyl peroxide, p-metbylbenzoyl peroxide, tert-butyl perbenzoate, azobisisobutyronitrile, and azobis-(2,4-dimethyl)-valeronitrile, without being limited thereto. These may be used alone or as mixtures thereof. The polymerization initiator may be present in an amount of about 0.01 parts by weight to about 10 parts by weight, preferably about 0.03 parts by weight to about 5 parts by weight, based on 100 parts by weight of the monomer mixture.

The chain-transfer agent may be used to adjust the weight average molecular weight of the thermoplastic (meth)acrylate copolymer and to improve thermal stability thereof. The weight average molecular weight may also be adjusted by the amount of the polymerization initiator included in the monomer mixture. However, if polymerization is stopped by the chain-transfer agent, an end of a chain has a second carbon structure. The end of the chain having the second carbon structure has stronger bonding strength than an end of a chain having a double bond created when the chain-transfer agent is not used. Thus, addition of the chain-transfer agent can improve thermal stability of the thermoplastic (meth)acrylate copolymer, thereby improving optical properties thereof.

The chain-transfer agent may be a typical chain-transfer agent known in the art. Examples of the chain-transfer agent may include: alkyl mercaptan in the form of $CH_3(CH_2)_nSH$ (where n is an integer from 1 to 20) including n-butyl mercaptan, n-octyl mercaptan, n-dodecyl mercaptan, t-dodecyl mercaptan, isopropyl mercaptan, n-amyl mercaptan, and the like; halogenated compounds including carbon tetrachloride, and the like; and aromatic compounds including α-methylstyrene dimers and α-ethylstyrene dimers, without being limited thereto. These may be used alone or as mixtures thereof. The chain-transfer agent may be present in an amount of about 0.01 parts by weight to about 10 parts by weight. Within this range, the thermoplastic (meth)acrylate copolymer can have thermal stability and suitable molecular weight. Preferably, the thermoplastic (meth)acrylate copolymer is present in an amount of about 0.02 parts by weight to about 5 parts by weight.

The thermoplastic (meth)acrylate copolymer according to the present invention may further include at least one of typical additives, such as suspension stabilizers, suspension stabilization aids, flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and the like. The additives may be present in an amount of about 0.001 to 20 parts by weight based on 100 parts by weight of the monomer mixture, without being limited thereto. These additives may be added during a polymerization or pelletization process by any method.

The suspension stabilizer may include: organic suspension stabilizers including polyalkyl acrylate-acrylic acid, polyolefin-maleic acid, polyvinyl alcohol, cellulose, and the like; inorganic suspension stabilizers including tricalcium phosphate, and the like; and mixtures thereof, without being limited thereto.

The suspension stabilization aids may include disodium hydrogen phosphate, sodium dihydrogen phosphate and the like, and may also include sodium sulfate in order to control solubility of a water-soluble polymer or monomer.

The antioxidant may be octadecyl 3-(3,5-di-tert-butyl-4-hydroxyphenyl)propionate, triethylene glycol-bis-3 (3-tert-butyl-4-hydroxy-5-methylphenyl)propionate, 2,6-di-tert-butyl-4-methylphenol, 2,2'-methylenebis(4-methyl-6-tert-butylphenol), tri(2,4-di-tert-butylphenyl)phosphite, n-octadecyl-3(3,5-di-tert-butyl-4-hydroxyphenyl)propionate, 1,3,5-tri(3,5-di-tert-butyl-4-hydroxybenzyl)isocyanate, 3-3,5-di-tert-butyl-4-hydroxyphenyl, distearyl thiodipropionate, lauryl thiopropionate methane, and di-phenylisooctyl phosphinate, without being limited thereto. These may be used alone or as mixtures thereof.

After polymerization, cooling, washing, dehydration, drying, and the like are performed, thereby providing a thermoplastic (meth)acrylate copolymer in particle form.

The thermoplastic (meth)acrylate copolymer has a non-crosslinked structure, preferably a linear structure. Such a thermoplastic (meth)acrylate copolymer having a non-crosslinked structure allows extrusion and injection molding, and exhibits excellent compatibility with other resins, such as a polycarbonate resin.

In some embodiments, the thermoplastic (meth)acrylate copolymer has a glass transition temperature from about 90° C. to about 150° C., preferably from about 101° C. to about 130° C. The thermoplastic (meth)acrylate copolymer is suitable for extrusion or injection molding at a temperature higher than or equal to the glass transition temperature.

In some embodiments, the thermoplastic (meth)acrylate copolymer may have a Vicat softening temperature (VST) from about 100° C. to about 140° C., as measured under conditions of 5 kg and 50° C./hr in accordance with ASTM D1525.

In some embodiments, the thermoplastic (meth)acrylate copolymer may have a weight average molecular weight from about 3,000 g/mol to about 300,000 g/mol. Within this range, the thermoplastic (meth)acrylate copolymer can have both compatibility and mechanical properties.

The thermoplastic (meth)acrylate copolymer may have an index of refraction at a thickness of 2.5 mm from about 1.495 to about 1.640, and a transmittance of about 85% or higher as measured in accordance with ASTM D1003.

The thermoplastic (meth)acrylate copolymer may be prepared in pellet form through extrusion. Extrusion may be performed by a typical method known in the art. Further, extrusion of the thermoplastic (meth)acrylate copolymer may be performed by adding at least one of additives, such as flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, flame-proofing agents, and the like, to the thermoplastic (meth)acrylate copolymer.

Another aspect of the present invention relates to a resin composition including the thermoplastic (meth)acrylate copolymer. The resin composition may include a resin compatible with the thermoplastic (meth)acrylate copolymer. For example, the thermoplastic (meth)acrylate copolymer may be blended with a thermoplastic resin, such as polycarbonate, polyethylene, and polystyrene resins, without being limited thereto. Preferably, polycarbonate is used.

A further aspect of the present invention relates to a molded product including the thermoplastic (meth)acrylate copolymer. The molded product may be prepared by molding a resin composition including the thermoplastic (meth)acrylate copolymer or a blend of the thermoplastic (meth)acrylate copolymer with other resins. Examples of molding methods include extrusion molding, injection molding, and casting, without being limited thereto. These molding methods are well known to those skilled in the art. For example, the resin composition may be prepared in pellet form by simultaneously mixing the above components and other additives, followed by melt-extrusion in an extruder. The prepared pellets may be formed into various molded products through various molding methods, such as injection molding, extrusion molding, and the like.

The molded product may include various plastic molded products. Since the composition including the thermoplastic (meth)acrylate copolymer according to the present invention exhibits excellent properties in terms of scratch resistance, impact strength, transparency, and moldability, the resin composition may be applied to molding of various articles. Particularly, the molded products may be broadly applied as exterior materials of various electric and electronic components, parts or automobile components, lenses, window glass, and the like. For example, the molded products may include housings for electric/electronic home appliances, such as televisions, audio systems, washing machines, cassette players, MP3 players, telephones, game consoles, video players, computers, photocopiers, and the like, and interior/exterior materials of automobiles, such as dashboards of automobiles, instrument panels, door panels, quarter panels, wheel covers, and the like.

Next, the present invention will be better appreciated from the following examples. It should be understood that these examples are provided for illustration only and are not to be construed in any way as limiting the present invention.

Descriptions of details apparent to those skilled in the art will be omitted.

MODE FOR INVENTION

Examples

Components used in Examples and Comparative Examples are as follows.

(A) Aromatic (meth)acrylate having an index of refraction from about 1.580 to about 1.700

(A1) o-biphenylmethacrylate, (A2) p-biphenylmethacrylate (B) Monofunctional unsaturated monomer:

(B1) Methyl methacrylate, (B2) Methyl acrylate, (B3) Styrene (C) Alicyclic or aromatic (meth)acrylate having an index of refraction from about 1.490 to about 1.579: (C1) Benzyl methacrylate, (C2) Phenyl methacrylate Example 1

0.5 parts by weight of n-mercaptan was uniformly mixed with 100 parts by weight of a monomer mixture including 10 wt % of o-biphenyl methacrylate monomer, 87.5 wt % of methyl methacrylate monomer and 2.5 wt % of methyl acrylate monomer. In a stainless steel high pressure reactor including a stirrer, small amounts of disodium hydrogen phosphate, sodium sulfate, and the like were dissolved in 130 parts by weight of ion exchange water, and 0.2 parts by weight of polymethyl acrylate-methyl acrylic acid was added to the mixture, followed by stirring. Then, the reactor was filled with an inert gas such as nitrogen and heated at 72° C. for 3 hours and at 110° C. for 2 hours for polymerization. After completion of the reaction, particles were prepared through washing, dehydration and drying, and the weight average molecular weight of the particles was measured.

Examples 2 to 9 and Comparative Examples 1 to 7

Acrylic copolymers were prepared in the same manner as in Example 1 except that the kind of monomer and the contents thereof were changed as in Table 1.

0.1 parts by weight of a hindered phenol-based heat stabilizer was added to the prepared acrylic copolymer, followed by melting, kneading and extrusion, thereby preparing pellets. Here, extrusion was performed using a twin-screw extruder (L/D=29) having a diameter of 45 mm, and the prepared pellets were dried at 80° C. for 6 hours, followed by injection molding using a 6 oz injection machine, thereby preparing specimens. The prepared specimens were evaluated as to index of refraction, flame retardancy, haze, and total light transmittance. Results are shown in Tables 1 and 2.

Property Evaluation (1) Weight average molecular weight (g/mol) was measured by GPC (Gel Permeation Chromatography).

(2) Glass transition temperature Tg (° C.) was measured using a differential scanning calorimeter (DSC).

(3) Index of refraction was measured on a 2.5 mm thick specimen at 20° C. using a refractometer DR-A1 (ATAGO).

(4) Heat resistance (Vicat softening temperature: VST, ° C.) was measured under conditions of a load of 5 kg at 50° C./hr) in accordance with ASTM D1525.

(5) Scratch resistance was measured in accordance with Ball-type Scratch Profile (BSP) Test. Here, a 10 mm to 20 mm long scratch was applied to a surface of a specimen having a size of L90 mm×W50 mm×t2.5 mm under a load of 1,000 g at a scratch speed of 75 mm/min using a spherical metal tip having a diameter of 0.7 mm. As an indicator of scratch resistance, a scratch width (μm) was measured by surface scanning a profile of the applied scratch with a metal stylus tip having a diameter of 2 μm using a contact type surface profile analyzer XP-1 (Ambios Co., Ltd.). A smaller scratch width indicates higher scratch resistance.

TABLE 1

| Kind | | Example | | | | | | | | |
|---|---|---|---|---|---|---|---|---|---|---|
| | | 1 | 2 | 3 | 4 | 5 | 6 | 7 | 8 | 9 |
| Monomer | (A1) | 30 | — | — | 10 | — | 30 | — | — | — |
| | (A2) | — | 10 | 15 | — | 10 | — | 10 | 10 | 10 |
| | (B1) | 67.5 | 87.5 | 82.5 | 67.5 | 57.5 | 47.5 | 67.5 | 67.5 | 47.5 |
| | (B2) | 2.5 | 2.5 | 2.5 | 2.5 | 2.5 | 2.5 | 2.5 | 2.5 | 2.5 |
| | (B3) | — | — | — | — | — | — | — | — | — |
| | (C1) | — | — | — | 20 | 30 | 20 | 20 | — | — |
| | (C2) | — | — | — | — | — | — | — | 20 | 40 |
| Property | Mw (×1000) | 88 | 82 | 41 | 91 | 87 | 85 | 85 | 88 | 82 |
| | Tg (° C.) | 120.0 | 119.1 | 120.5 | 106.1 | 101.5 | 109.2 | 107.1 | 112.0 | 103.3 |
| | Index of refraction | 1.5341 | 1.5043 | 1.5118 | 1.5200 | 1.5273 | 1.5501 | 1.5199 | 1.5204 | 1.5363 |
| | VST | 113.1 | 113.0 | 111.5 | 97.7 | 95.1 | 99.8 | 98.3 | 105.1 | 96.0 |
| | BSP Width (μm) | 181 | 170 | 172 | 180 | 178 | 179 | 171 | 171 | 178 |

TABLE 2

| Kind | | Comparative Example | | | | | | |
|---|---|---|---|---|---|---|---|---|
| | | 1 | 2 | 3 | 4 | 5 | 6 | 7 |
| Monomer | (A1) | — | — | — | — | — | — | — |
| | (A2) | — | — | — | — | — | — | 10 |
| | (B1) | 97.5 | 67.5 | 67.5 | 47.5 | — | — | — |
| | (B2) | 2.5 | 2.5 | 2.5 | 2.5 | — | — | — |
| | (B3) | — | — | — | — | 70 | 90 | 90 |
| | (C1) | — | 30 | — | — | — | — | — |
| | (C2) | — | — | 30 | 50 | 30 | 10 | — |
| Property | Mw (×1000) | 90 | 84 | 35 | 86 | 157 | 172 | 173 |
| | Tg (° C.) | 116.6 | 98.7 | 103.9 | 95.8 | 90.2 | 94.4 | 100.2 |
| | Index of refraction | 1.4890 | 1.1528 | 1.5134 | 1.5147 | 1.5837 | 1.5870 | 1.5940 |
| | VST | 108.1 | 90.2 | 93.8 | 89.1 | 85.3 | 87.8 | 91.0 |
| | BSP Width (μm) | 180 | 182 | 185 | 189 | 252 | 272 | 267 |

In Table 1, it can be seen that the copolymers prepared in Examples 1 to 9 had a higher index of refraction, a higher Vicat softening temperature, and better property balance than the copolymers prepared in Comparative Examples 1 to 7.

It should be understood that various modifications, changes, alterations, and equivalent embodiments can be made by those skilled in the art without departing from the spirit and scope of the invention.

The invention claimed is:

1. A thermoplastic (meth)acrylate copolymer, comprising: a derivative unit obtained from a monomer mixture comprising:
   (A) an aromatic (meth)acrylate having an index of refraction from about 1.580 to about 1.700; and
   (B) a monofunctional unsaturated monomer,
   wherein the thermoplastic (meth)acrylate copolymer has a weight average molecular weight of about 41,000 g/mol to about 300,000 g/mol,
   wherein the thermoplastic (meth)acrylate copolymer has a Vicat softening temperature (VST) of about 100° C. to about 140° C. as measured under conditions of a load of 5 kg at 50° C./hr in accordance with ASTM D1525.

2. The thermoplastic (meth)acrylate copolymer according to claim 1, wherein the monomer mixture comprises: about 1 wt % to about 50 wt % of the (A) aromatic (meth)acrylate having an index of refraction from about 1.580 to about 1.700; and about 50 wt % to about 99 wt % of the (B) the monofunctional unsaturated monomer.

3. The thermoplastic (meth)acrylate copolymer according to claim 1, further comprising: about 49 wt % or less of a derivative unit obtained from (C) an alicyclic or aromatic (meth)acrylate having an index of refraction from about 1.490 to about 1.579.

4. The thermoplastic (meth)acrylate copolymer according to claim 1, wherein the thermoplastic (meth)acrylate copolymer has a non-crosslinked structure.

5. The thermoplastic (meth)acrylate copolymer according to claim 1, wherein the thermoplastic (meth)acrylate copolymer has a glass transition temperature from about 90° C. to about 150° C., and permits extrusion or injection molding at a temperature higher than or equal to the glass transition temperature.

6. The thermoplastic (meth)acrylate copolymer according to claim 1, wherein the thermoplastic (meth)acrylate copolymer has an index of refraction at a thickness of 2.5 mm from about 1.495 to about 1.640, and a transmittance of about 85% or higher, as measured in accordance with ASTM D1003.

7. The thermoplastic (meth)acrylate copolymer according to claim 1, wherein the (A) aromatic (meth)acrylate having an index of refraction from about 1.580 to about 1.700 comprises a biphenyl structure.

8. The thermoplastic (meth)acrylate copolymer according to claim 1, wherein the (A) aromatic (meth)acrylate comprises a structure represented by Formula 1:

[Formula 1]

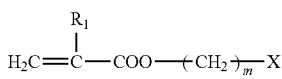

wherein R₁ is hydrogen or a methyl group; m is an integer from 0 to 10; and X is a substituted or unsubstituted biphenyl group, or a substituted or unsubstituted terphenyl group.

9. The thermoplastic (meth)acrylate copolymer according to claim 1, wherein the (B) monofunctional unsaturated monomer comprises at least one selected from the group consisting of a $C_1$ to $C_8$ alkyl(meth)acrylate; an unsaturated carboxylic acid including methacrylic acid; an acid anhydride including maleic anhydride; a hydroxyl group-containing (meth)acrylate; (meth)acrylamide; unsaturated nitrile; allyl glycidyl ether; glycidyl methacrylate; and styrene monomers.

10. The thermoplastic (meth)acrylate copolymer according to claim 3, wherein the (C) alicyclic or aromatic (meth) acrylate having an index of refraction from about 1.490 to about 1.579 comprises a structure represented by Formula 2 or Formula 3:

[Formula 2]

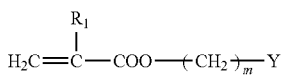

wherein R₁ is hydrogen or a methyl group; m is an integer from 0 to 10; and Y is a substituted or unsubstituted $C_5$ to $C_{20}$ cycloalkyl group, a substituted or unsubstituted $C_6$ to $C_{20}$ aryl group, or a substituted or unsubstituted $C_6$ to $C_{20}$ aralkyl group;

[Formula 3]

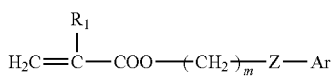

wherein R₁ is hydrogen or a methyl group; m is an integer from 0 to 10; Z is oxygen (O) or sulfur (S); and Ar is a substituted or unsubstituted $C_5$ to $C_{20}$ cycloalkyl group, a substituted or unsubstituted $C_6$ to $C_{20}$ aryl group, or a substituted or unsubstituted $C_6$ to $C_{20}$ aralkyl group.

11. The thermoplastic (meth)acrylate copolymer according to claim 1, further comprising: at least one selected from the group consisting of flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, and flame-proofing agents.

12. A molded product formed through extrusion or injection molding of a resin composition comprising the thermoplastic (meth)acrylate copolymer according to claim 1.

13. The molded product according to claim 12, wherein the resin composition further comprises a polycarbonate resin.

14. A method of preparing a thermoplastic (meth)acrylate copolymer, comprising: suspension polymerization by adding a radical polymerization initiator to a monomer mixture comprising (A) an aromatic (meth)acrylate having an index of refraction from about 1.580 to about 1.700, and (B) a monofunctional unsaturated monomer, wherein the thermoplastic (meth)acrylate copolymer has a weight average molecular weight of about 41,000 g/mol to about 300,000 g/mol, and wherein the thermoplastic (meth)acrylate copolymer has a Vicat softening temperature (VST) of about 100° C. to about 140° C. as measured under conditions of a load of 5 kg at 50° C./hr in accordance with ASTM D1525.

15. The method according to claim 14, wherein the polymerization is performed in the presence of a suspension stabilizer and a chain-transfer agent.

16. The method according to claim 14, further comprising: adding at least one additive to the monomer mixture, the at least one additive being selected from the group consisting of flame retardants, surfactants, nucleating agents, coupling agents, fillers, plasticizers, impact modifiers, lubricants, antibacterial agents, release agents, heat stabilizers, antioxidants, light stabilizers, compatibilizers, inorganic additives, colorants, stabilizers, lubricating agents, antistatic agents, pigments, dyes, and flame-proofing agents.

17. The method according to claim 14, wherein the monomer mixture further comprises an alicyclic or aromatic (meth) acrylate having an index of refraction from about 1.490 to about 1.579.

* * * * *